United States Patent
Nishikawa et al.

(10) Patent No.: US 6,911,270 B2
(45) Date of Patent: Jun. 28, 2005

(54) MASTER INFORMATION CARRIER FOR MAGNETIC TRANSFER

(75) Inventors: Masakazu Nishikawa, Kanagawa-ken (JP); Kazuhiro Niitsuma, Kanagawa-ken (JP); Tadashi Yasunaga, Kanagawa-ken (JP); Toshihiro Usa, Kanagawa-ken (JP); Kazunori Komatsu, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 10 days.

(21) Appl. No.: 10/317,111

(22) Filed: Dec. 12, 2002

(65) Prior Publication Data

US 2003/0113583 A1 Jun. 19, 2003

(30) Foreign Application Priority Data

Dec. 14, 2001 (JP) ........................................ 2001-380908

(51) Int. Cl.$^7$ ................................................ G11B 5/64
(52) U.S. Cl. ....................... 428/686; 428/156; 428/213; 428/409; 428/694 T; 360/16
(58) Field of Search ................................ 428/686, 156, 428/213, 409, 694 T, 611, 636, 668, 678, 679, 680, 681, 682, 161, 163, 167, 212; 360/15, 16, 17

(56) References Cited

U.S. PATENT DOCUMENTS 6,347,016 B1 * 2/2002 Ishida et al. ................... 360/17
6,735,026 B2 * 5/2004 Nishikawa et al. ............ 360/17
6,759,183 B2 * 7/2004 Nagao et al. ................ 430/320
6,785,069 B2 * 8/2004 Nishikawa et al. ............ 360/17
2001/0046097 A1 * 11/2001 Nishikawa .................... 360/16
2003/0002182 A1 * 1/2003 Kamatani et al. .............. 360/17
2003/0008099 A1 * 1/2003 Nishikawa et al. ......... 428/65.3
2003/0099867 A1 * 5/2003 Nishikawa et al. ... 428/694 SG
2003/0123169 A1 * 7/2003 Hamaguchi et al. .......... 360/17
2004/0023071 A1 * 2/2004 Sakai et al. ........... 428/694 BS

FOREIGN PATENT DOCUMENTS

| JP | 63-183623 | | 7/1988 |
| JP | 2001-14667 | | 1/2001 |
| JP | 2001-256644 A | * | 9/2001 |
| JP | 2002-050038 A | * | 2/2002 |
| JP | 2002-074655 A | * | 3/2002 |

OTHER PUBLICATIONS

JPO abstract Translation of JP–2002–050038–A.*
JPO Abstract Translation of JP–2001–256644–A.*
JPO Abstract Translation of JP–2002–074655–A.*

* cited by examiner

*Primary Examiner*—Kevin M. Bernatz
(74) *Attorney, Agent, or Firm*—Sughrue Mion, PLLC

(57) ABSTRACT

A master information carrier for magnetic transfer includes a base sheet which is formed of a magnetic material. The master information carrier is provided with an irregularity pattern representing information to be transferred to a magnetic recording medium and a magnetic layer formed along the irregularity pattern. The saturation magnetization Mm of the magnetic layer and the saturation magnetization Ms of the base sheet satisfy the condition $1.0 < Mm/Ms < 100$.

9 Claims, 3 Drawing Sheets

MASTER INFORMATION CARRIER FOR MAGNETIC TRANSFER

BACKGROUND OF THE INVENTION

1. Field of the Invention

This invention relates to a master information carrier carrying thereon an irregularity pattern representing the information to be transferred to a magnetic medium.

2. Description of the Related Art

With an increase in information quantity, there is a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc or a ZIP (Iomega) in the form of a flexible disc. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At the present, such preformat recording is performed by the use of a specialized servo recording apparatus (a servo track writer). However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication Nos. 63 (1988)-183623, 2001-14667 and U.S. Pat. No. 6,347,016, a magnetic transfer method in which a pattern which is formed on a master information carrier and represents servo information is copied to a magnetic recording medium (a slave medium) by magnetic transfer.

In the magnetic transfer, the magnetization pattern representing the information (e.g., servo information) carried by a master information carrier is magnetically transferred from the master information carrier to a slave medium by applying a transfer magnetic field to the slave medium and the master information in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

The master information carrier employed in the magnetic transfer disclosed in Japanese Unexamined Patent Publication No. 2001-14667 and U.S. Pat. No. 6,347,016 comprises a patterned base sheet having on the surface thereof an irregularity pattern representing the information to be transferred and a magnetic layer formed at least on the surface of the protruding portions of the base sheet.

As a method of forming such a patterned base sheet, there has been known a method in which an irregularity pattern is formed on the surface of a non-magnetic flat plate by photolithography which has been employed in the field of semiconductor. However, it has been found that when the signal is transferred to a slave medium from a master information carrier comprising a non-magnetic base sheet, the quality of the transferred signal can greatly deteriorate due to asymmetry.

We, these inventors, have come to conceive that in the conventional master information carrier, where the base sheet is non-magnetic, since only the magnetic layer formed on the base sheet contributes to convergence of magnetic fluxes and convergence of magnetic fluxes concentrates on the magnetic layer, turbulence is generated in the magnetic field established on the slave medium side, which deteriorates symmetry (increases the degree of asymmetry). The magnetic layer on the base sheet is as thin as several tens to several hundreds nm, and the edges of the protruding portions are sharp. Due to such a small thickness of the magnetic layer and such a shape of the magnetic layer, the transfer magnetic layer is stabilized in the energy state at the edges of the protruding portions and concentration of magnetic fluxes on the edges occurs, which, we have determined, causes uniformity of the magnetic field in the area of transfer to deteriorate.

Further, we have determined that, in order to suppress turbulence of the magnetic field in the area of transfer of the slave medium, it is necessary to use a magnetic base sheet to rectify the transfer magnetic field passing through the slave medium.

However our further investigation has revealed that the transfer magnetic field in the area of transfer of the slave medium cannot be rectified by simply forming the base sheet itself of a magnetic material.

SUMMARY OF THE INVENTION

In view of the foregoing observations and description, the primary object of the present invention is to provide an improved master information carrier for magnetic transfer which allows to obtain a high-quality signal from a slave medium.

In accordance with the present invention, there is provided a master information carrier for magnetic transfer comprising a base sheet which is formed of a magnetic material and is provided with an irregularity pattern representing information to be transferred to an in-plane magnetic recording medium, and a magnetic layer formed along the irregularity pattern, wherein the improvement comprises that the saturation magnetization Ms of the base sheet and the saturation magnetization Mm of the magnetic layer satisfy the following condition, $$1.0 < Mm/Ms < 100.$$

It is preferred that the saturation magnetization Ms of the base sheet and the saturation magnetization Mm of the magnetic layer satisfy the following condition, $$2.0 \leq Mm/Ms < 3.9.$$

The magnetic material for the base sheet is a material which draws the magnetic fluxes into the base sheet when applied with a magnetic field and may comprise either elements of one kind or elements of a plurality of kinds. So long as the above condition is satisfied in total, the base sheet may contain non-magnetic elements.

It is further preferred that the magnetic layer be of a body-centered cubic structure (bcc) or a face-centered cubic structure (fcc) or an amorphous structure in crystallographic structure.

It is preferred that the saturation magnetization Ms of the base sheet be not smaller than 5.65 T (4500 Gauss).

Further, it is preferred that the height of the protruding portion of the irregularity pattern on the base sheet be not smaller than 40 nm.

Further it is preferred that the height h1 of the protruding portion of the irregularity pattern on the base sheet and the height h2 of the magnetic layer on the upper surface of the protruding portion of the irregularity pattern from the surface of magnetic layer on the recessed portion of the irregularity pattern (i.e., the distance between the upper surface of the protruding portion of the irregularity pattern and the surface of magnetic layer on the recessed portion of the irregularity pattern) satisfy the following formula $$0.2 \leq h2/h1 \leq 0.8.$$

More preferably, $0.3 \leq h2/h1 \leq 0.6$.

The information to be transferred to the magnetic recording medium is, for instance, a servo signal.

According to our investigation, when $100 \leq Mm/Ms$, concentration of magnetic fluxes on the edges of the protruding portions cannot be satisfactorily prevented whereas when $Mm/Ms \leq 1$, the magnetic fluxes drawn in the master information carrier cannot be satisfactorily released from the protruding portions thereof. When $1.0 < Mm/Ms < 100$, concentration of magnetic fluxes on the edges of the protruding portions can be satisfactorily prevented and at the same time, the magnetic fluxes can be sufficiently released from the protruding portions, whereby uniformity of the magnetic field in the area of transfer can be improved and the transfer magnetic field in the slave medium can be rectified.

Thus, when $1.0 < Mm/Ms < 100$, the transfer magnetic field in the slave medium can be rectified and the magnetization pattern representing the information carried by the master information carrier is optimally transferred from the master information carrier to a slave medium, whereby a high-quality reproduction signal can be obtained from the slave medium.

We have further found that when $2.0 \leq Mm/Ms < 3.9$, the transfer magnetic field in the slave medium can be better rectified and a higher-quality reproduction signal can be obtained from the slave medium.

The aforesaid effect obtained by forming the base sheet of a magnetic material and setting the saturation magnetization Ms of the base sheet and the saturation magnetization Mm of the magnetic layer to satisfy the aforesaid condition is remarkable in a master information carrier where the minimum inter-pattern distance (the minimum distance between the protruding portions) of the irregularity pattern is not larger than 300 nm.

Further, it has been found that a higher-quality reproduction signal can be obtained from the slave medium when the magnetic layer is of a body-centered cubic structure or a face-centered cubic structure or an amorphous structure in crystallographic structure. In the master information carrier employed in the magnetic transfer disclosed in Japanese Unexamined Patent Publication No. 10(1998)-40544, the magnetic layer is of Co. Co is normally of a hexagonal close-packed structure having an axis of easy magnetization in a direction of c-axis. In the magnetic transfer, it is necessary to apply a magnetic field in a circumferential direction when the slave medium is an in-plane recording medium and in a perpendicular direction when the slave medium is a perpendicular recording medium. In the case where the magnetic layer of the master information carrier is formed of a magnetic material having an axis of easy magnetization, the intensity of the transferred signal is weakened, which can result in reduction of output of the signal and/or a dull edge of the signal unless the axis of easy magnetization is controlled to be parallel to the direction of the transfer magnetic field. We suppose this is because it is difficult for magnetization to be orientated in the direction of the transfer magnetic field due to misalignment of the direction of the transfer magnetic field and the direction of the axis of easy magnetization. Since a material of a body-centered cubic structure or a face-centered cubic structure or an amorphous structure in crystallographic structure has no axis of easy magnetization, when the magnetic layer is formed of such a material, all the magnetization is more apt to be orientated in the direction of the transfer magnetic field as compared with when the magnetic layer is formed of a hexagonal close-packed structure having an uncontrolled axis of easy magnetization. Since it is difficult to control the axis of easy magnetization, the manufacturing process can be simplified and the productive efficiency can be improved by using a magnetic material having no axis of easy magnetization.

Our further investigation has revealed that when the height h1 of the protruding portion of the irregularity pattern on the base sheet and the height h2 of the magnetic layer on the upper surface of the protruding portion of the irregularity pattern from the surface of magnetic layer on the recessed portion of the irregularity pattern satisfy $0.2 \leq h2/h1 \leq 0.8$, the transfer magnetic field rectifying effect is further enhanced. That is, we have found that when the ratio h2/h1 is smaller than 0.2, the distance by which the transfer magnetic field generated by magnetic fluxes released from edges of the protruding portions spreads in perpendicular to the surface of the magnetic layer is shortened and accordingly, magnetic fluxes cannot sufficiently penetrate into the slave medium as the distance between the master information carrier and the slave medium becomes large, whereas when the ratio h2/h1 is larger than 0.8, the transfer magnetic field leaks in the magnetic layer between the protruding portions of the irregularity pattern on the surface of the master information carrier, which results in fear that the transfer magnetic field can be insufficient in intensity.

DESCRIPTION OF THE PREFERRED EMBODIMENTS

Figure 1:
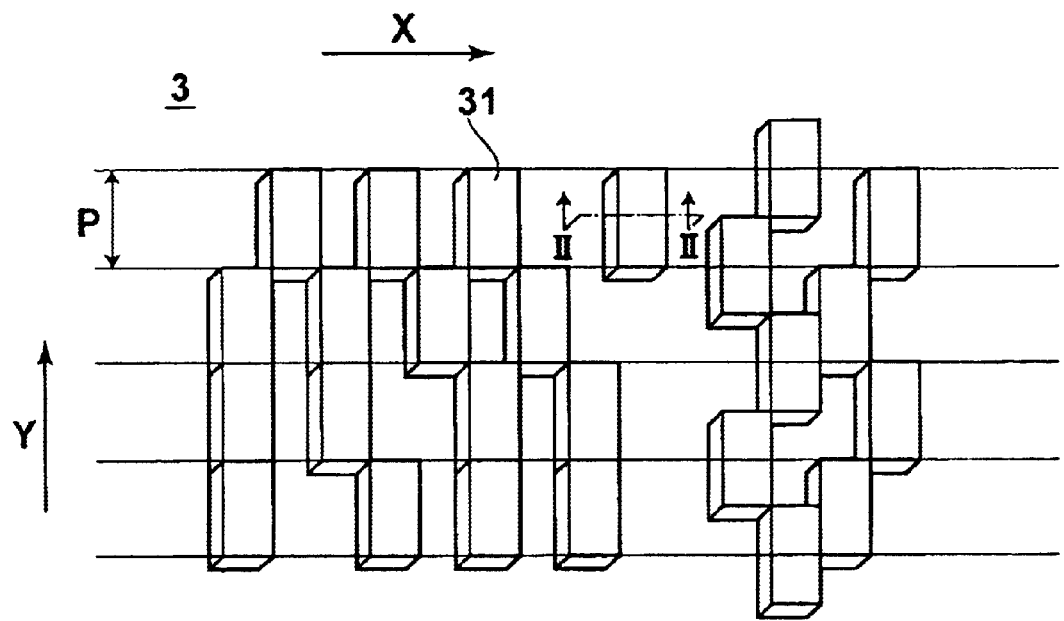
FIG. 1 is a plan view partly in a perspective view showing a master information carrier for magnetic transfer in accordance with a first embodiment of the present invention.

A master information carrier for preformatting in-plane magnetic recording media in accordance with an embodiment of the present invention will be described first. In FIG. 1, a master information carrier 3 in accordance with the embodiment of the present invention is like a disc in shape and comprises a base sheet 3a having a plurality of protruding portions 31 arranged in a pattern formed on the surface thereof (as a result the base sheet 3a has an irregularity pattern) and a magnetic layer 3b formed along the irregularity pattern. The irregularity pattern represents information to be transferred to a magnetic recording media (slave media) and FIG. 1 shows a part of the irregularity pattern. In FIG. 1, arrow X indicates the circumferential direction (the direction of track) and arrow Y indicates the radial direction. For example, the information to be transferred may be a servo signal.

Figure 2:
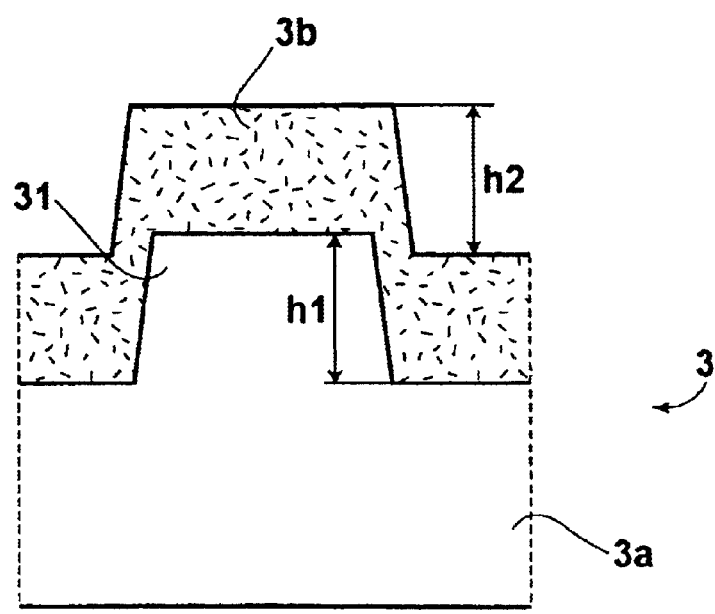
FIG. 2 is a fragmentary cross-sectional view taken along line II—II in FIG. 1.

FIG. 2 is a fragmentary cross-sectional view of a part of the master information carrier 3 including a protruding portion 31 on the base sheet 3a taken along a line parallel to the direction X of track.

In the master information carrier 3 of this embodiment, the base sheet 3a and the magnetic layer 3b are formed of materials such that the saturation magnetization Ms of the base sheet 3a and the saturation magnetization Mm of the magnetic layer 3b satisfy the condition 1.0<Mm/Ms<100 (preferably 2.0≦Mm/Ms<3.9). The saturation magnetization Ms of the base sheet is not smaller than 5.65 T (4500 Gauss). For example, the base sheet 3a of the master information carrier 3 may be formed of nickel or nickel alloy. The magnetic layer 3b may be formed of, for instance, alloys such as FeCo, FeCoNi and FeNi which contain at least one of Fe, Co, Ni, Gd, Dy, Sm, and Nd and are of a face-centered cubic structure (fcc) in crystallographic structure. So long as exhibiting ferromagnetism in total, the magnetic layer 3b may contain other magnetic elements or non-magnetic elements. Though may be soft, semi-hard or hard, it is preferred in view of obtaining better magnetic transfer that the magnetic layer 3b be a soft or semi-hard magnetic layer relatively small in coercive force. Further, as described above, it is further preferred that the magnetic layer 3b be of a body-centered cubic structure (bcc) or a face-centered cubic structure (fcc) or an amorphous structure in crystallographic structure. In the case where the magnetic layer 3b is of a body-centered cubic structure (bcc) or a face-centered cubic structure (fcc), it is preferred that the magnetic layer 3b has a particle structure where fine particles are arranged at random and each particle is not larger than 100 nm in size as observed from the surface of the magnetic layer.

The height h1 of the protruding portion 31 of the irregularity pattern on the base sheet 3a is not smaller than 40 nm. The height h1 of the protruding portion of the irregularity pattern on the base sheet and the height h2 of the magnetic layer on the upper surface of the protruding portion of the irregularity pattern from the surface of magnetic layer on the recessed portion of the irregularity pattern satisfy the formula, 0.1≦h2/h1≦0.8. More preferably, 0.3≦h2/h1≦0.6.

When the magnetic base sheet 3a and the magnetic layer 3b satisfy the aforesaid conditions, the magnetization pattern representing the information carried by the master information carrier is optimally transferred from the master information carrier to a slave medium 2, whereby a high-quality reproduction signal can be obtained from the slave medium 2. Further, when the height h1 of the protruding portion 31 of the irregularity pattern on the base sheet 3a is not smaller than 40 nm and the height h1 of the protruding portion of the irregularity pattern on the base sheet and the height h2 of the magnetic layer on the upper surface of the protruding portion of the irregularity pattern from the surface of magnetic layer on the recessed portion of the irregularity pattern satisfy the formula, 0.2≦h2/h1≦0.8, absorption and release of the magnetic fluxes at the edges of the protruding portions 31 can be improved and a higher-quality reproduction signal can be obtained from the slave medium 2. When the height h1 of the protruding portion 31 of the irregularity pattern is smaller than 40 nm, there arises a fear that magnetic fluxes cannot be sufficiently released from the protruding portions 31 to the space (toward the slave medium 2) and a sufficient intensity of the transfer magnetic field cannot be ensured.

The base sheet 3a having thereon the irregularity pattern or the pattern of the protruding portions 31 can be formed, for instance, by the use of stamper method or photolithography.

A photo-resist layer is first formed on a smooth glass plate (or a smooth crystal plate), for instance, by spin coating, and a laser beam (or an electron beam) modulated according to the servo signal is projected onto the photo-resist layer while rotating the glass plate so that the photo-resist layer is exposed to the laser beam in a predetermined pattern, e.g., a pattern of servo signals each extending in a radial direction in one track. Thereafter the photo-resist layer is developed and the part exposed to the laser beam is removed with an irregularity pattern of the photo-resist left on the glass plate, thereby obtaining a matrix. Then the surface of the matrix is plated (electroforming), and a Ni base sheet having a positive irregularity pattern is formed on the matrix and separated from the matrix. The Ni base sheet as it is may be used as a master information carrier or may be used as a master information carrier after forming a magnetic layer and a protective layer along the irregularity pattern as desired.

Otherwise, the matrix may be plated to form a second matrix and the second matrix may be plated to form a base sheet having a negative irregularity pattern. Further, a third matrix may be formed by plating the second matrix or pressing a resin syrup against the surface of the second matrix and curing the resin syrup, and a base sheet having a positive irregularity pattern may be formed by plating the third matrix.

Further, a matrix without photo-resist layer may be first formed by etching the glass plate with an irregularity pattern of the photo-resist to make holes in the glass plate, and a base sheet may be formed by the use of the matrix in the manner described above.

The base sheet may be formed of metal such as Ni or Ni alloy as described above, and as the aforesaid plating for forming the metal base sheet, various metal film forming techniques such as electroless plating, electroforming, sputtering, or ion plating can be employed. The height of the protruding portion (the depth of the irregularity pattern) should be not smaller than 40 nm, preferably in the range of 50 to 800 nm and more preferably 80 to 600 nm. When the irregularity pattern represents a sample servo signal, each of the protruding portions is rectangle having longer sides in a radial direction of the base sheet and shorter sides in a circumferential direction of the same. When the irregularity pattern represents a sample servo signal, each of the protruding portions is preferably 0.05 to 20 μm in the longer sides and 0.05 to 5 μm in the shorter sides.

The magnetic layer 3b may be formed on the irregularity pattern by various vacuum film forming techniques or plating methods such as vacuum deposition, sputtering, ion plating and the like of magnetic material. The thickness of the magnetic layer 3b is preferably 50 to 500 nm and more preferably 80 to 300 nm. As described above, the ratio h2/h1 of the height h1 of the protruding portion of the irregularity pattern on the base sheet to the height h2 of the magnetic layer on the upper surface of the protruding portion of the irregularity pattern from the surface of magnetic layer on the recessed portion of the irregularity pattern is not smaller than 0.2 and not larger than 0.8.

It is preferred that a protective film 5 to 30 nm thick such as of DLC (diamond-like carbon) be provided on the magnetic layer on the upper surface of the protruding portion 31. A lubricant layer may be further provided on the protective film. A reinforcement layer such as a Si layer may be provided between the magnetic layer 3b and the protective film to enhance the contact therebetween. The lubricant layer suppresses deterioration in durability of the magnetic layer 3b, such as scores due to friction, which occurs in correcting for a shift generated when the magnetic layer 3b is brought into contact with the slave medium.

Magnetic transfer of information to a slave medium by the use of a master information carrier in accordance with the present invention will be described, hereinbelow.

Figure 3:
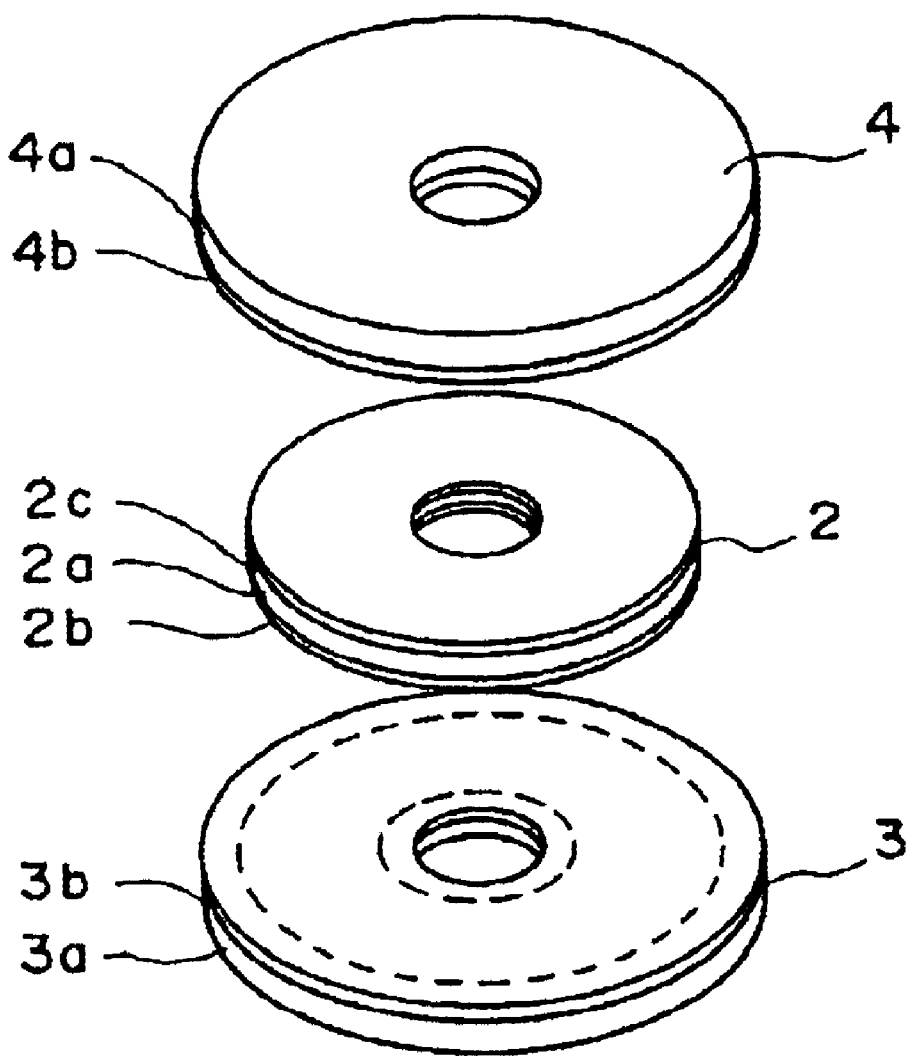
FIG. 3 is an exploded perspective view of a double-sided slave medium and a pair of master information carriers carrying thereon master information to be transferred to opposite sides of the slave medium.

As shown in FIG. 3, a pair of master information carriers 3 and 4 are disposed on opposite sides of a slave medium 2. The slave medium 2 may be, for instance, a hard disc or a flexible disc. In this particular embodiment, the slave medium 2 is provided with a pair of in-plane recording magnetic layers 2b and 2c formed on lower and upper sides of a disc-shaped base sheet 2a though the slave medium 2 may be provided with a single recording layer on one side thereof.

Both the master information carriers 3 and 4 are in accordance with the present invention and respectively provided with irregularity patterns formed on the upper side of a base sheet 3a and the lower side of a base sheet 4a representing pieces of information to be transferred to the lower and upper magnetic layers 2b and 2c. Magnetic layers 3b and 4b are formed along the irregularity patterns.

Though, in FIG. 3, the lower and upper master information carriers 3 and 4 and the slave medium 2 are away from each other, in the actual magnetic transfer process, the magnetic layer 3b of the lower master information carrier 3 is brought into contact with or to the vicinity of the lower magnetic layer 2b of the slave medium 2 and the magnetic layer 4b of the upper master information carrier 4 is brought into contact with or to the vicinity of the upper magnetic layer 2c of the slave medium 2.

Figure 4A:
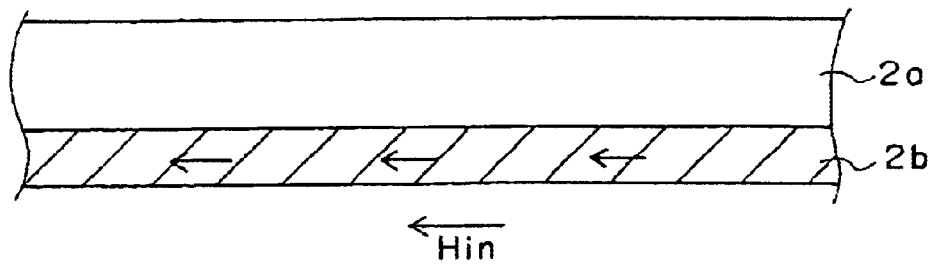
FIGS. 4A to 4C are views for illustrating basic steps of magnetic transfer to an in-plane magnetic medium.
Figure 4B:
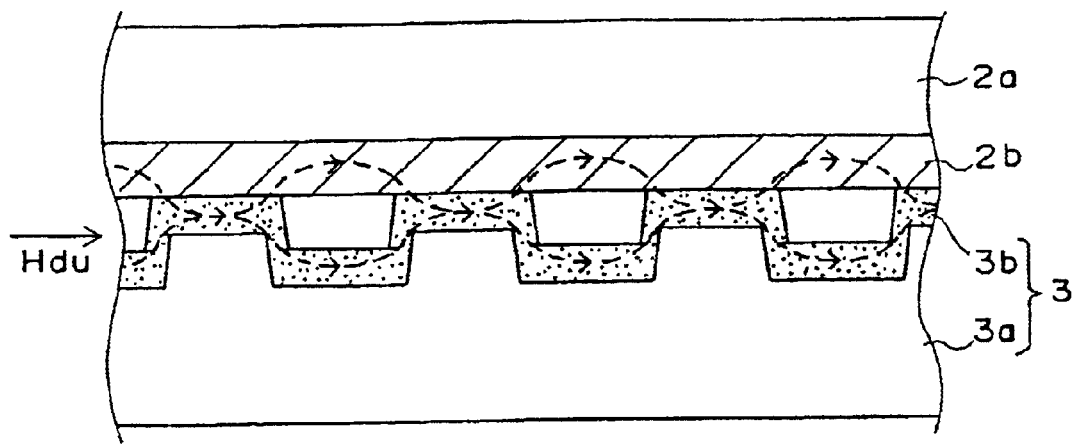
Figure 4C:
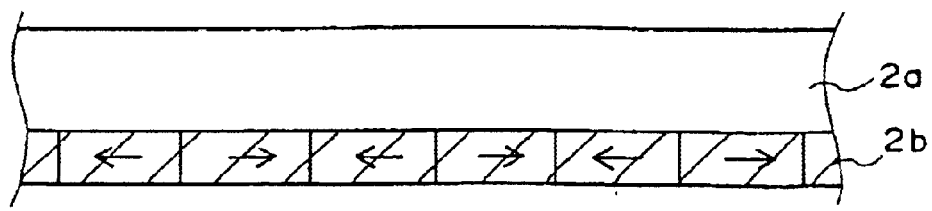

Basic steps of magnetic transfer to an in-plane magnetic recording medium will be described with reference to FIGS. 4A to 4C, hereinbelow. In FIGS. 4A to 4C, only the lower magnetic layer 2b is shown.

An initial DC magnetic field Hin is first applied to the slave medium 2 in one direction parallel to the recording tracks thereof, thereby magnetizing the magnetic layer 2b of the slave medium 2 in an initial DC magnetization as shown in FIG. 4A. Thereafter, the magnetic layer 3b of the lower master information carrier 3 is brought into close contact with the lower magnetic layer 2b of the slave medium 2. In this state, a transfer magnetic field Hdu is applied in the direction opposite to the initial DC magnetic field Hin as shown in FIG. 4B, thereby magnetically transferring the information on the master information carrier 3 to the lower magnetic layer 2b of the slave medium 2. As a result, information represented by the irregularity pattern on the master information carrier 3 is transferred to the lower magnetic layer 2b as shown in FIG. 4C. The information represented by the irregularity patterns on a pair of master information carriers may be transferred to opposite sides of the slave medium either simultaneously or in sequence.

In the case where the irregularity pattern representing information to be transferred is a negative pattern reverse to the positive pattern shown in FIGS. 4A to 4C, the information can be magnetically transferred to the slave medium 2 by reversing the directions of the initial DC magnetic field Hin and the transfer magnetic field Hdu. The intensities of the initial DC magnetic field and the transfer magnetic field are determined on the basis of the coercive force of the slave medium 2, the specific permeabilities of the master information carrier and the slave medium, and the like.

A magnetic recording disc such as a hard disc or a high-density flexible disc is generally employed as the slave medium 2. The magnetic layer thereof is generally of a coated magnetic material or a metal film.

In the case of a slave medium having a magnetic layer of metal film, the material of the magnetic layer may be Co, Co alloy (e.g., CoPtCr, CoCr, CoPtCrTa, CoPtCrNbTa, CoCrB, CoNi, Co/Pd), Fe or Fe alloy (e.g., FeCo, FePt, FeCoNi). It is preferred in view of obtaining clearer magnetic transfer that the magnetic layer be higher in magnetic flux density and has a magnetic anisotropy conforming to the recording system of the slave medium, that is, in the case of an in-plane recording medium, in a direction parallel to the direction of tracks and in the case of a perpendicular recording medium, in a direction perpendicular to the direction of tracks. The magnetic layer of the slave medium is preferably not smaller than 10 nm and not larger than 500 nm in thickness, and more preferably not smaller than 20 nm and not larger than 200 nm in thickness.

It is further preferred that the magnetic layer of the slave medium 2 be provided with a non-magnetic primer layer on the base sheet side thereof in order to give the magnetic layer a necessary magnetic anisotropy. The primer layer may be, for instance, of Cr, CrTi, CoCr, CrTa, CrMo, NiAl, Ru or Pd, but should match to the magnetic layer in crystallographic structure and lattice constant. The thickness of the primer layer is preferably not smaller than 10 nm and not larger than 150 nm, and more preferably not smaller than 20 nm and not larger than 80 nm.

Though, in the embodiment described above, the slave medium is an in-plane recording medium, the present invention can be applied to the case where the slave medium is a perpendicular recording medium.

EXAMPLES

Master information carriers in accordance with first to eighth embodiments of the present invention and first to third comparative examples were made in the following way and the signal was transferred from the master information carriers to the slave media produced in the manner described later. Then transferred signal quality was evaluated in the following manner. The result is shown in the following table. In the table, "emb" is an abbreviation of "embodiment", "c/e" is an abbreviation of "comparative example", "CS" is an abbreviation of "crystallographic structure", "ev" is an abbreviation of "evaluation", and "ASY" is an abbreviation of "asymmetry".

Evaluation of the Transferred Signal Quality

Quality of the signal reproduced from the slave medium was evaluated by the use of electromagnetic conversion property meter (SS-60: KYODO Electronics). A GMR head which was 0.12 $\mu$m in reproducing head gap, 0.41 $\mu$m in reproducing track width, 0.2 $\mu$m in recording head gap and 0.67 $\mu$m in recording track width was employed.

The read signal was divided into frequencies by a spectro-analyzer, and the difference C/N between the peak intensity C of the primary signal and the medium noise N obtained by extrapolation was measured. The quality of the signal reproduced from the slave medium was evaluated on the basis of the relative values ΔC/N with the difference C/N between the peak intensity C of the primary signal and the medium noise N obtained from the same slave medium by recording and reproducing the same signal by the use of the same GMR head instead of magnetic transfer taken as 0 db. When the relative value ΔC/N is larger than −1.5 db, the transferred signal quality was evaluated as an excellent state ○, when the relative value ΔC/N is not smaller than −3.0 db and not smaller than −1.5 db, the transferred signal quality was evaluated as a good state Δ and when the relative value ΔC/N is smaller than −3.0 db, the transferred signal quality was evaluated as a poor state X.

Second, asymmetry ASY is calculated according to the output of positive polarity (TAA+) and the output of negative polarity (TAA−) on the basis of the following formula.

$$ASY=\{[(TAA+)-(TAA-)]/\{[(TAA+)+(TAA-)]*100 \quad (5)$$

Then if the value of ASY was not smaller than 0% and smaller than 5%, the asymmetry was evaluated as excellent ○, if the value of ASY was not smaller than 5% and smaller than 10%, it was evaluated as good Δ and if the value of ASY was 10% or more, it was evaluated as poor X.

First Embodiment

In the master information carrier in accordance with a first embodiment of the present invention, the base sheet was formed of Ni by the use of stamper method. An irregularity pattern signal which were 1.0 μm in track width and 1.1 μm in track pitch and extended from an innermost position at a distance of 20 mm from the center to an outermost position at a distance of 40 mm from the center was formed on the base sheet in a height of 0.2 μm of the protruding portions. The bit length was 0.2 μm in the innermost position.

A magnetic layer of FeCO (30 at %) having a bcc structure was formed on the Ni base sheet at 25° C. The Ar sputtering pressure was $1.44\times10^{-1}$ Pa (1.08 mTorr), and the power supplied was 2.80 W/cm$^2$.

In the master information carrier of the first embodiment, Mm/Ms=3.8 and h2/h1=0.7.

The master information carriers of the second to eighth embodiments and the first to third comparative examples were produced in manners similar to the first embodiment except that the base sheet and the magnetic layer were formed of different material and in different thickness so that the crystallographic structure of the magnetic layer, the value of Mm/Ms and the value of h2/h1 differ from those of the first embodiment.

Second Embodiment

The master information carrier of the second embodiment was produced in the same manner as the first embodiment except that the magnetic layer was of Co having a hcp structure and Mm/Ms was 2.8.

Third Embodiment

The master information carrier of the third embodiment was produced in the same manner as the first embodiment except that the magnetic layer was of CoNi50 having a fcc structure and Mm/Ms was 2.0.

Fourth Embodiment

The master information carrier of the fourth embodiment was produced in the same manner as the first embodiment except that the magnetic layer was of FeMn50 having a bcc structure and Mm/Ms was 2.5.

Fifth Embodiment

The master information carrier of the fifth embodiment was produced in the same manner as the first embodiment except that h2.h1 was 0.1.

Sixth Embodiment

The master information carrier of the sixth embodiment was produced in the same manner as the first embodiment except that h2.h1 was 0.9.

Seventh Embodiment

The master information carrier of the seventh embodiment was produced in the same manner as the first embodiment except that the base sheet was of (FeCO$_2$)P alloy and Mm/Ms was 92.

Eighth Embodiment

The master information carrier of the eighth embodiment was produced in the same manner as the first embodiment except that the magnetic layer was of Co FeB amorphous alloy and Mm/Ms was 2.0.

Comparative Example 1

The master information carrier of the first comparative example was produced in the same manner as the first embodiment except that the magnetic layer was of Ni having a fcc structure and Mm/Ms was 1.0.

Comparative Example 2

The master information carrier of the second comparative example was produced in the same manner as the first embodiment except that the magnetic layer was of CuNi80 having a fcc structure and Mm/Ms was 0.8.

Comparative Example 3

The master information carrier of the third comparative was produced in the same manner as the first embodiment except that the base sheet was of NiP alloy having a fcc structure and Mm/Ms was 113.

The slave media were produced in the following manner. That is, 3.5" disc-shaped in-plane magnetic recording media were prepared by a sputtering apparatus (S-50S: Shibaura Mechatronics). The sputtering apparatus was evacuated to $1.33\times10^{-5}$ Pa ($1.0\times10^{-4}$ Torr) at the room temperature and then argon was introduced into the apparatus to a pressure of 0.4 Pa (3.0 mTorr). Under these conditions, glass discs were heated to 200° C. and a magnetic layer consisting of a 30 nm thick CrTi and 30 nm thick CoCrPt layer was formed on each of the glass discs. Each of the slave media was 5.65 T (4500 Gauss) in saturation magnetization Ms and 199 kA/m (2500 e) in coercive force.

TABLE

|        | Mn/Ms | h2/h1 | Cs        | Δ (dB)/(ev) | ASY (%)/(ev) |
|--------|-------|-------|-----------|-------------|--------------|
| emb. 1 | 3.8   | 0.7   | bcc       | −0.2(○)     | 2(○)         |
| emb. 2 | 2.8   | 0.7   | hcp       | −1.7(Δ)     | 7(Δ)         |
| emb. 3 | 2.0   | 0.7   | fcc       | −2.0(Δ)     | 3(○)         |
| emb. 4 | 2.5   | 0.7   | bcc       | +0.2(○)     | 3(○)         |
| emb. 5 | 3.8   | 0.1   | bcc       | −1.2(○)     | 8(Δ)         |
| emb. 6 | 3.8   | 0.9   | bcc       | −1.6(Δ)     | 1(○)         |
| emb. 7 | 92    | 0.7   | bcc       | −1.4(○)     | 5(Δ)         |
| emb. 8 | 2.0   | 0.7   | amorphous | −0.7(○)     | 1(○)         |
| c/e. 1 | 1.0   | 0.7   | fcc       | −4.2(X)     | 11(X)        |
| c/e. 2 | 0.8   | 0.7   | fcc       | −4.5(X)     | 15(X)        |
| c/e. 3 | 113   | 0.7   | bcc       | −3.1(X)     | 26(X)        |

As can be understood from the table, in the first to eighth embodiments which satisfied 1.0<Mm/Ms<100, both the transferred signal quality and the asymmetry were Δ or ○. On the other hand, in the first to third comparative examples which did not satisfy 1.0<Mm/Ms<100, both the transferred signal quality and the asymmetry were X.

In the fifth and sixth embodiments which were the same as the first embodiment except that they did not satisfy 0.2≦h2/h1≦0.8, one of the transferred signal quality and the asymmetry were Δ whereas in the first embodiment, both the transferred signal quality and the asymmetry were ○, which indicated that it is necessary to satisfy 0.2≦h2/h1≦0.8 in order to form a better magnetization pattern.

Further, even if 1.0<Mm/Ms<100 and 0.2≦h2/h1≦0.8 were both satisfied, the embodiment which was a hcp structure in crystallographic structure as the second embodiment could not obtained ○ and could obtained only Δ in both the transferred signal quality and the asymmetry, which indicated that the magnetic layer which was a bcc, a fcc or an amorphous in crystallographic structure was better than that which was a hcp in crystallographic structure.

What is claimed is:

1. A master information carrier for magnetic transfer in which a magnetic field is applied in a circumferential direction comprising
   a base sheet which is formed of a magnetic material and is provided with protruding portions and recessed portions which constitute an irregularity pattern representing information to be transferred to an in-plane magnetic recording medium, and
   a magnetic layer formed on at least the upper surface of the protruding portions of the irregularity pattern and on the recessed portions of the irregularity pattern and the height h1 of the protruding portion of the irregularity pattern and the height h2 of the magnetic layer on the upper surface of the protruding portion of the irregularity pattern from the surface of magnetic layer on the recessed portion of the irregularity pattern satisfy the following formula $0.2 \leq h2/h1 \leq 0.8$, wherein a saturation magnetization Ms of the base sheet and a saturation magnetization Mm of the magnetic layer satisfy the following condition, $1.0 < Mm/Ms < 100$.

2. The master information carrier as defined in claim 1 in which the saturation magnetization Mm of the base sheet and the saturation magnetization Mm of the magnetic layer satisfy the following condition, $2.0 \leq Mm/Ms < 3.9$.

3. The master information carrier as defined in claim 1 in which the magnetic layer is of a body-centered cubic structure or a face-centered cubic structure or an amorphous structure in crystallographic structure.

4. The master information carrier as defined in claim 1 in which $0.3 \leq h2/h1 \leq 0.6$.

5. The master information carrier as defined in claim 1 in which the saturation magnetization Ms of the base sheet is not smaller than 5.65 T (4500 Gauss).

6. The master information carrier as defined in claim 1 in which the height of the protruding portion of the irregularity pattern on the base sheet is not smaller than 40 nm.

7. The master information carrier as defined in claim 1 in which the information to be transferred to the magnetic recording medium is a servo signal.

8. The master information carrier as defined in claim 1, wherein the magnetic layer is higher in magnetic flux density than a recording system of a slave medium and has a magnetic anisotropy conforming to a recording system of a slave medium.

9. A master information carrier for magnetic transfer in which a magnetic field is applied in a circumferential direction comprising
   a base sheet which is formed of a magnetic material and is provided with protruding portions and recessed portions which constitute an irregularity pattern representing information to be transferred to an in-plane magnetic recording medium, and
   a magnetic layer formed on at least the upper surface of the protruding portions of the irregularity pattern,
   wherein the saturation magnetization Ms of the base sheet is not smaller than 5.65 T (4500 Gauss), and
   wherein a saturation magnetization Ms of the base sheet and a saturation magnetization Mm of the magnetic layer satisfy the following condition, $1.0 < Mm/Ms < 100$.

* * * * *